Feb. 18, 1947.   H. C. DONER   2,415,939
COMBINATION FOOD PROCESSING UNIT AND HOME POWER TOOL
Filed Feb. 10, 1944   2 Sheets-Sheet 1
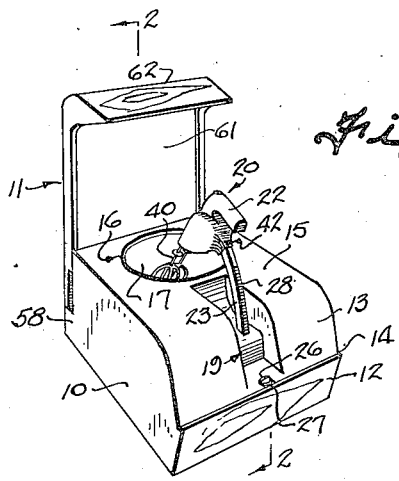
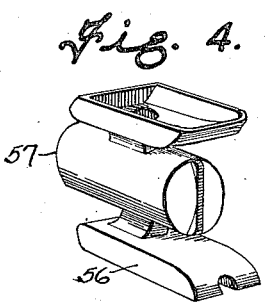
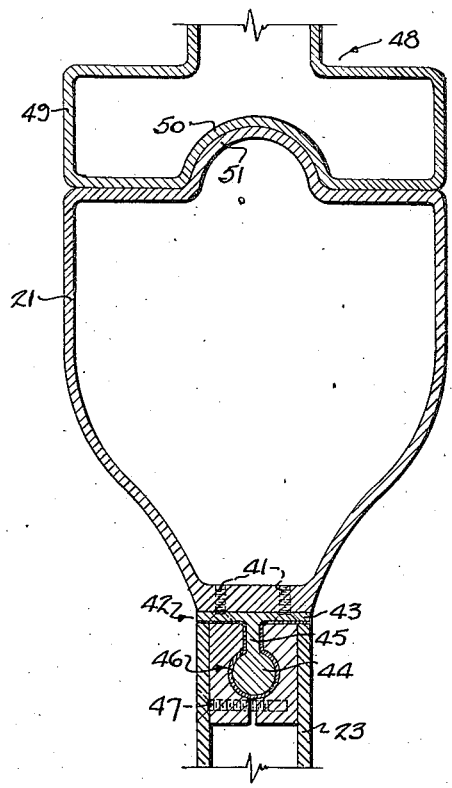
Inventor
HALBERT CRESTON DONER.
By Frank Fener
Attorney

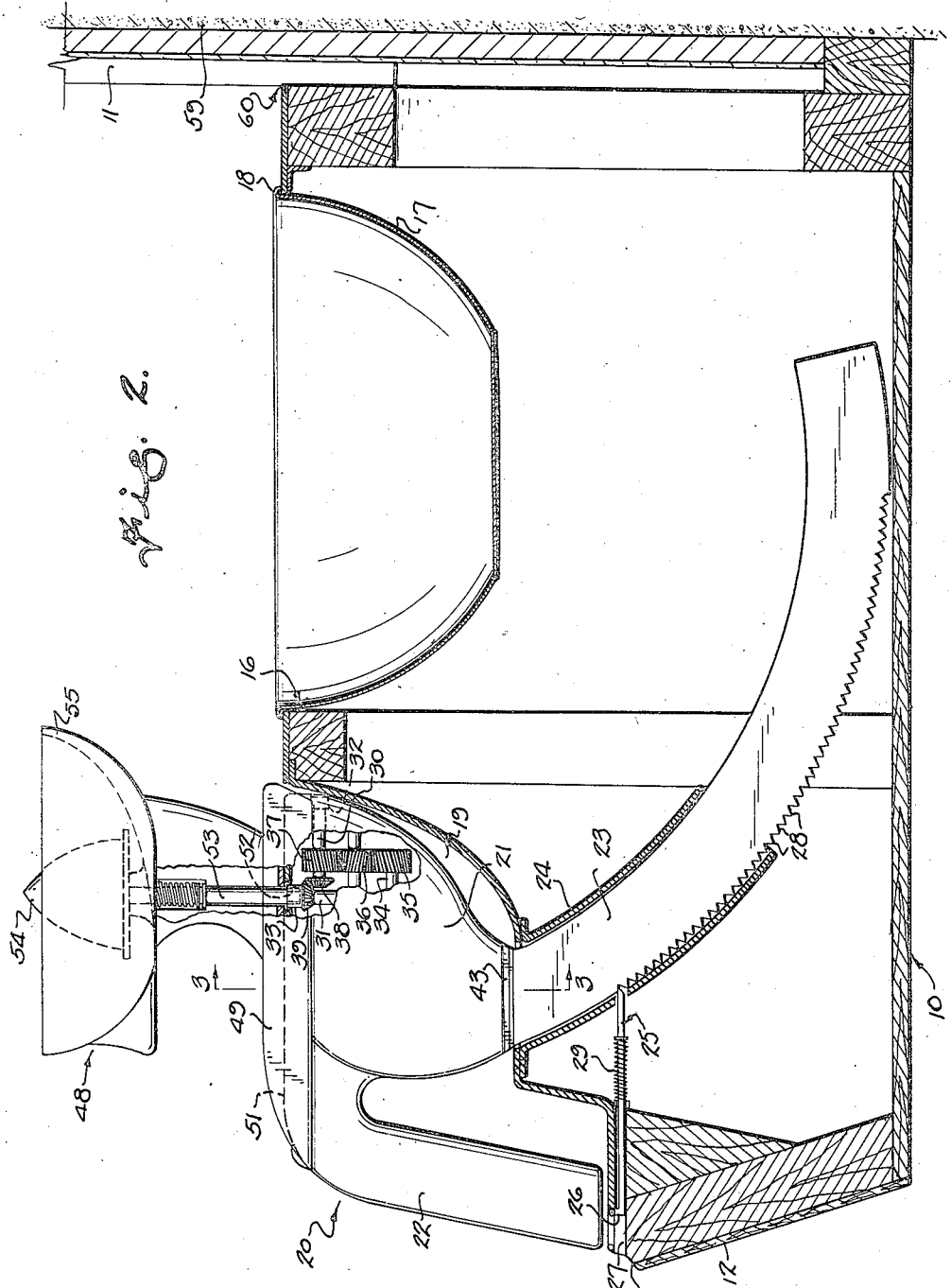

Patented Feb. 18, 1947

2,415,939

UNITED STATES PATENT OFFICE 2,415,939

COMBINATION FOOD PROCESSING UNIT AND HOME POWER TOOL

Halbert Creston Doner, Toledo, Ohio, assignor to Libbey-Owens-Ford Glass Company, Toledo, Ohio, a corporation of Ohio Application February 10, 1944, Serial No. 521,888

15 Claims. (Cl. 259—108)

The present invention relates to food processing apparatus, and more particularly to a cabinet type of unit designed for mixing, grinding and similarly treating foodstuffs.

The apparatus of the invention forms a part of a comprehensive and revolutionary set-up of kitchen equipment; other and cooperating items of which have already been disclosed in detail in Design Patents 135,813, issued June 15, 1943, and 135,842, issued June 22, 1943; and in copending applications Serial No. 466,582, filed November 23, 1942; Serial No. 467,605, filed December 2, 1942; Serial No. D–111,215, filed September 27, 1943 (now Design Patent 137,946, dated May 23, 1944); Serial No. D–111,218, filed September 27, 1943 (now Design Patent 137,791 dated May 2, 1944); and Serial No. D–111,219, filed September 27, 1943 (now Design Patent 137,792, dated May 2, 1944).

This invention has for its primary purpose the provision of a food processing cabinet that is attractive in appearance and includes a novel combination of elements that are designed to carry out a plurality of different operations within a single unit.

More specifically, the invention contemplates, in a cabinet of the above character, the provision of a built-in support for food receptacles, and a specially designed housing for an electrical motor that is movable into and out of different operating positions to supply the motive power for various food processing tools.

Another object is to provide a compact unit of this type in which the working parts are received within recesses in the top surface of the cabinet and, when not in use, are concealed by a substantially flat cover, the surface contour of which conforms to that of the kitchen counter top with which it is used, to provide an uninterrupted work surface when said cover is in closed position.

Other objects and advantages of the invention will become more apparent during the course of the following description, when taken in connection with the accompanying drawings.

In the drawings, wherein like numerals are employed to designate like parts throughout the same:

Fig. 1 is a perspective view of the processing unit with the cover of the cabinet open and the mixer or beater in operative position;

Fig. 2 is a vertical section through the unit taken substantially on the line 2—2 in Fig. 1, showing the motor housing within its recess and with the juice extractor in operative position;

Fig. 3 is a section through the motor housing, with the motor removed, taken substantially on the line 3—3 in Fig. 2; and Fig. 4 is a perspective view of a food grinder of the type adapted for use in the unit.

With more detailed reference to the drawings, and especially to Figs. 1 and 2, it will be noted that the cabinet of the processing unit here illustrated comprises essentially a base or body portion 10 and a top or cover 11. The cover 11 is substantially of inverted L shape when open, and when closed covers the top of the body portion 10 to completely conceal the working parts of the unit. Thus in closed position, when the unit is not in use, the upper surface of the cover 10 provides a convenient work counter, shelf or table.

In fact, although the unit of the invention is definitely not restricted to use with any other specific equipment, the embodiment shown is especially designed to fit into an assembly of kitchen units as disclosed in Design Patent 135,842, issued June 22, 1943. The present unit is of the same general outline as those illustrated in the patent so that, when closed, it will form a part of the continuous uninterrupted counter top shown. Like the units of the patent, it is adapted to be hung on the wall and so can be adjusted vertically to the proper height to suit the individual preference, and to minimize stretching, stooping and uncomfortable positions while using the various pieces of equipment.

The base 10 of the cabinet is substantially rectangular in shape, with its front wall comprising an upwardly and forwardly inclined lower portion 12 and an upwardly and rearwardly inclined upper portion 13, connected to the lower portion by a narrow concave ledge 14 and merging into a generally flat, horizontal top wall 15. Toward the rear of the horizontal top wall 15 is a centrally located circular opening or recess 16 adapted to receive a dish or other food container 17. As here shown, the dish 17 is provided with an annular flange 18 which engages and rests upon the top wall 15 to support the dish within the opening 16, but of course other and different supporting means can be used if desired.

Cut into the top wall 15 and the upper portion 13 of the front wall of the base 10 is a second recess 19, shaped to receive an electric motor 20 from which the various food processing tools or appliances are operated. The motor 20 includes a housing 21, provided with a pistol grip 22 to facilitate handling during use and removably mounted at the upper end of curved bar 23 that is slidingly received within a sleeve 24. With this arrangement, when the grip 22 is in the hand of the operator the motor 20 can be readily moved to any desired location on its curved path of travel extending from the rest position shown in Fig. 2 to the stirring position shown in Fig. 1.

In order to maintain the motor 20 fixed in a position to which it has been moved, there is slidably mounted under the bottom wall of the recess 19 a plunger or bar 25. One end of the plunger 25 extends outside of the body portion and is provided with an upturned end 26 forming a handle which rides in a groove 27 in the bottom wall of the recess 19. The opposite end of the plunger is cut off at an angle to permit it to engage a series of ratchet teeth 28 formed in one face of the curved bar 23, with which it is urged into engagement by a compression spring 29 acting between the inside wall of the body portion 10 and a collar formed on the plunger 25.

The shape of the end of the spring pressed plunger 25 with relation to that of the ratchet teeth 28 is such that the motor can be lifted upwardly without interruption therefrom. However, the plunger 25, when in engagement with any one of the ratchet teeth 28, will resist downward movement of the motor and maintain it in position until the plunger is retracted by grasping the handle 26 and moving the plunger outwardly against the action of the spring 29.

As indicated above, the motor 20 is adapted to drive a stirring device when in raised position as shown in Fig. 1, and to operate other and different appliances when in rest position within the recess 19. For this reason, there is journaled in suitable bearings within the motor housing 21, a pair of auxiliary or intermediate drive shafts 30 and 31, extending at right angles to one another, and provided with coupling elements 32 and 33 respectively which are aligned with suitable openings in the motor housing. The intermediate shafts 30 and 31 may be driven from the motor shaft 34 in any desired manner, for example through the intermediary of a train of spiral gears 35, 36 and 37, and bevel gears 38 and 39.

Thus, when it is desired to use the stirring or mixing apparatus of the unit, the motor 20 is lifted from the recess 19 to approximately the position shown in Fig. 1 and the coupling element on the shaft of a stirring tool 40 is secured to the coupling element 32 on the drive shaft 30. No particular form of coupling device for connecting the intermediate drive shafts 30 and 31 with the driven shafts on the various food processing appliances has been shown, since any one of a number of pin type, sliding key, or interlocking couplers now on the market can be used with equally satisfactory results.

Although only a single dish or bowl 17 is shown in the recess 16, it will be obvious that a whole nest of bowls can be arranged and stored in the same place, and when the processing device is to be placed in operation it is only necessary to remove the bowls lying above or within the one that it has been decided to use. Because the center about which the arc of the curved bar 23 and the curved sleeve 24 has been swung is located at a central point within the area of the bowl 17, the stirring tool 40 will always be in engagement with the food being stirred regardless of the number or size of the bowls within the recess 16 and no matter at what point the motor 20 is positioned along its curved path of movement.

Another feature of the stirring apparatus of the unit is the fact that the motor with the stirrer attached can be readily removed from the curved bar 23, so that the operator can carry the device, held by the pistol grip, to a stove or counter top for additional stirring operations at locations removed from the cabinet. To this end, as best shown in Fig. 3, the motor housing 21 has secured to its bottom surface, by means of the machine screws 41, a connection 42 comprising a plate 43 carrying a substantially rod shaped element 44 secured thereto by the web 45. The rod and web of the connector 42 are designed to be received and to fit snugly within a similarly shaped groove 46 in the split upper end of the curved bar 23. The tightness of the fit can be controlled by a machine screw 47 and should be such as to normally hold the motor housing in position at the end of the bar but to permit it to be removed therefrom without difficulty. In order to supply electrical current to the motor 20 during its movement to and from the cabinet, the electrical cable leading to the motor will preferably be wound on a spring operated retracting reel (not shown).

The stirring device as illustrated can only be used when the motor is moved upwardly out of rest position, but other food processing appliances can be operated with the motor in any position. For instance, in Fig. 2 the motor 20 is in rest position within the recess 19 and a juice extractor 48 is shown in operative position. It will be seen by reference to Fig. 3 that the motor housing 21 and the platform 49 of the extractor are provided with interengaging portions 50 and 51 respectively which serve to maintain the device against accidental displacement while in use.

With the juice extractor 48 properly positioned with relation to the motor 20, the coupling element 52 on the juicer shaft 53 will be operatively connected to the coupling element 33 on the vertical intermediate shaft 31, and upon operation of the motor the extractor head 54 will be rotated in the usual manner. While the juice extracting appliance has been shown as operating with the motor 20 in lowered position, it will be understood that it can be used equally well with the motor in the position shown in Fig. 1, in which case the angle of the cup 55 will be such that as the juice is extracted from the fruit it will drain immediately into a bowl or dish in the recess 16.

The food grinder shown in Fig. 4 is equipped with a base 56 and drive connections (not shown) that are the same as those of the juice extractor 48 and consequently it can be mounted and operated in a similar manner. When the grinder is in operative position the end 57 thereof from which the ground food is expelled will be directly over the bowl or dish supporting recess 16.

In addition to its many uses in the processing of food, the home power tool of the invention also adapts itself readily to other household tasks. It will be noted that the connection between the motor housing 21 and the curved bar 23 is such that the housing cannot only be readily removed from the bar, but also that it can be reversed on the bar so that the stirrer 40, as shown in Fig. 1 for example, would extend outwardly away from the cabinet.

With the motor housing in this position, the stirrer 40 can be replaced by grinding or buffing tools, small power drills or the like and, when this is done, the device will double as a small work or hobby shop. A wide variety of tools can be used, and by the further provision of a universal type connection between the motor housing and the curved bar, the tools can be arranged in any desired position.

As shown in Figs. 1 and 2, the base 10 of the cabinet is provided with rectangular projection 58 which contacts the wall 59 of the kitchen when the processing unit is mounted for use, so that a slot 60 is formed between the wall and the cabinet for receiving the lower portion of the cover 11 when it is in raised position. Because of this arrangement, the cover 11 may either be loose from the body portion of the cabinet or connected to it by suitable slide or roller hinges or the like of well known construction.

With the cover 11 in raised position, the vertical portion 61 acts as a splash guard while the horizontally extending portion 62 becomes a partial hood. This works out very well with a tubular type light source which can be positioned just beneath the exended portion 62, because the hood effect directs the light rays downwardly onto the work surface and at the same time effectively conceals the source and prevents the direct rays from reaching the eyes of the operator.

It will be understood that the form of the invention herewith shown and described is to be taken as a preferred embodiment of the same, and that various changes in the shape, size and arrangement of parts may be resorted to without departing from the spirit of the invention or the scope of the subjoined claims.

I claim:

1. A food processing unit of the character described, comprising a base provided with a plurality of recesses, a motor adapted to fit within one of said recesses and mounted on said base for movement relative thereto, a shaft driven by said motor and adapted to be operatively connected to the drive shaft of a food processing tool and to support and drive the same, and a food container positioned within another of said recesses for operative association with said tool.

2. A food processing unit of the character described, comprising a cabinet including a base provided with a plurality of recesses, a motor adapted to fit within one of said recesses and mounted on said base for movement relative thereto, a shaft driven by said motor for operative connection with the drive shaft of a food processing tool, a food container positioned within another of said recesses for operative association with said tool, and a cover for said base concealing said motor and said container when they are in their respective recesses.

3. A food processing unit of the character described, comprising a base provided with a recess, a motor adapted to fit within said recess and mounted on said base for movement relative thereto, a shaft driven by said motor and adapted to be operatively connected to the drive shaft of a food processing tool to support and drive the same, and means for retaining said motor in selected positions intermediate its upper and lower limits of movement relative to said base.

4. A food processing unit of the character described, comprising a cabinet including a base provided with a plurality of recesses, a motor adapted to fit within one of said recesses and mounted on said base for movement relative thereto, a shaft driven by said motor for operative connection with the drive shaft of a food processing tool, means for retaining said motor in a selected position relative to said base, means for releasing said retaining means to return the motor to said recess, a food container positioned in another of said recesses for operative association with said tool, and a cover for said base concealing said motor and said container when they are in their respective recesses.

5. A food processing unit of the character described, comprising a base, a curved standard mounted for sliding movement within said base, a portable motor removably mounted on said standard for movement therewith relative to the base, a housing for said motor, a pistol grip associated with said housing, and a shaft driven by said motor for operative connection with the drive shaft of a food processing tool.

6. A food processing unit of the character described, comprising a cabinet including a base provided with a plurality of recesses, a food processing appliance comprising a motor adapted to fit into one of said recesses and a processing tool driven by said motor, and means for mounting said appliance for movement in a curved path toward and away from said base and into and out of operative relationship with another of said recesses including a curved standard supporting said motor and mounted for sliding movement within said base.

7. A food processing unit of the character described, comprising a base provided with a recess, a curved standard mounted for sliding movement within said base, a motor, a housing for said motor adapted to fit within said recess and mounted on said standard for movement into and out of the recess, and a plurality of intermediate drive shafts in said housing driven by said motor and adapted to be operatively connected with the drive shafts of different food processing tools.

8. A food processing unit of the character described, comprising a base provided with a recess, a curved standard mounted for sliding movement within said base, a motor, a housing for said motor adapted to fit within said recess and mounted on said standard for movement relative to the base, and a pair of intermediate drive shafts in said housing positioned at right angles to one another and driven by said motor and both adapted to be operatively connected with the drive shafts of different food processing tools.

9. A food processing unit of the character described, comprising a base provided with a recess, a motor adapted to fit within said recess and mounted on said base for movement in a curved path toward and away from said base, a plurality of shafts driven by said motor, one of said shafts lying in the horizontal plane when said motor is in said recess and being adapted for operative connection with the drive shaft of a food processing tool when said motor is out of the recess, and another of said shafts lying in the vertical plane when said motor is in the recess and being adapted for operative connection with the drive shaft of a food processing tool at all times.

10. A food processing unit of the character described, comprising a base provided with a recess, a motor adapted to fit within said recess and mounted on said base for movement in a curved path toward and away from said base, a plurality of shafts driven by said motor, one of said shafts lying in the horizontal plane when said motor is in said recess and being adapted to have operative connection with the drive shaft of a food processing tool when said motor is out of the recess, another of said shafts lying in the vertical plane when said motor is in the recess and being adapted to be operatively connected to the drive shaft of a food processing tool at all times, and a locating and retaining means for said last-mentioned tool associated with the motor.

11. A food processing unit of the character described, comprising a cabinet including a base provided with a plurality of recesses, a curved standard mounted for sliding movement within said base, a motor mounted on said standard for movement therewith and adapted to fit within one of said recesses, a shaft driven by said motor for operative connection with the drive shaft of a food processing tool, an L shaped cover for said base adapted to assume a vertical position at the rear of the base when open and to assume a horizontal position on top of the base when closed.

12. A home power unit of the character described, comprising a base provided with a recess, a motor adapted to fit within said recess and mounted on said base for movement relative thereto, a shaft driven by said motor for operative connection with the drive shaft of a processing tool, means for retaining said motor in selected position intermediate its upper and lower limits of movement, and means associated with the motor mounting to permit the position of the motor to be reversed with relation to said base.

13. A home power unit of the character described, comprising a base, a curved standard mounted for sliding movement within said base, a motor mounted on said standard for movement therewith relative to the base, a shaft driven by said motor and adapted to be operatively connected with the drive shaft of a processing tool, and connecting means between the motor and mounting means permitting the position of the former to be shifted relative to the latter.

14. A food processing unit of the character described, comprising a base, a curved bar mounted for sliding movement within said base, a motor mounted at the upper end of said bar for movement therewith relative to the base, and a shaft driven by said motor and adapted to be operatively connected to the drive shaft of a food processing tool.

15. A food processing unit of the character described, comprising a base provided with a recess therein, a motor adapted to fit within said recess, a curved bar mounting said motor for movement relative to said base, a shaft driven by said motor and adapted to be operatively connected to the drive shaft of a food processing tool to support and drive the same, and means engageable with said bar for retaining the motor in selected positions intermediate its upper and lower limits of movement relative to said base.

HALBERT CRESTON DONER.

REFERENCES CITED

The following references are of record in the file of this patent:

UNITED STATES PATENTS

| Number | Name | Date |
| --- | --- | --- |
| 2,141,971 | De Soutter | Dec. 27, 1938 |
| 1,445,948 | Hillix | Feb. 20, 1923 |
| 1,862,654 | Booth | June 14, 1932 |
| 2,061,868 | Fitzgerald | Nov. 24, 1936 |
| 1,489,242 | Gilchrist | Apr. 8, 1924 |
| 1,824,328 | Cammann, Jr. | Sept. 22, 1931 |
| 2,169,014 | Aalborg | Aug. 8, 1939 |
| 1,468,307 | Marx | Sept. 18, 1923 |
| 2,013,247 | Nash | Sept. 3, 1935 |
| 1,395,640 | Hemleb | Nov. 1, 1821 |

FOREIGN PATENTS

| Number | Country | Date |
| --- | --- | --- |
| 229,900 | British | Mar. 5, 1925 |